United States Patent Office 3,606,487
Patented Sept. 20, 1971

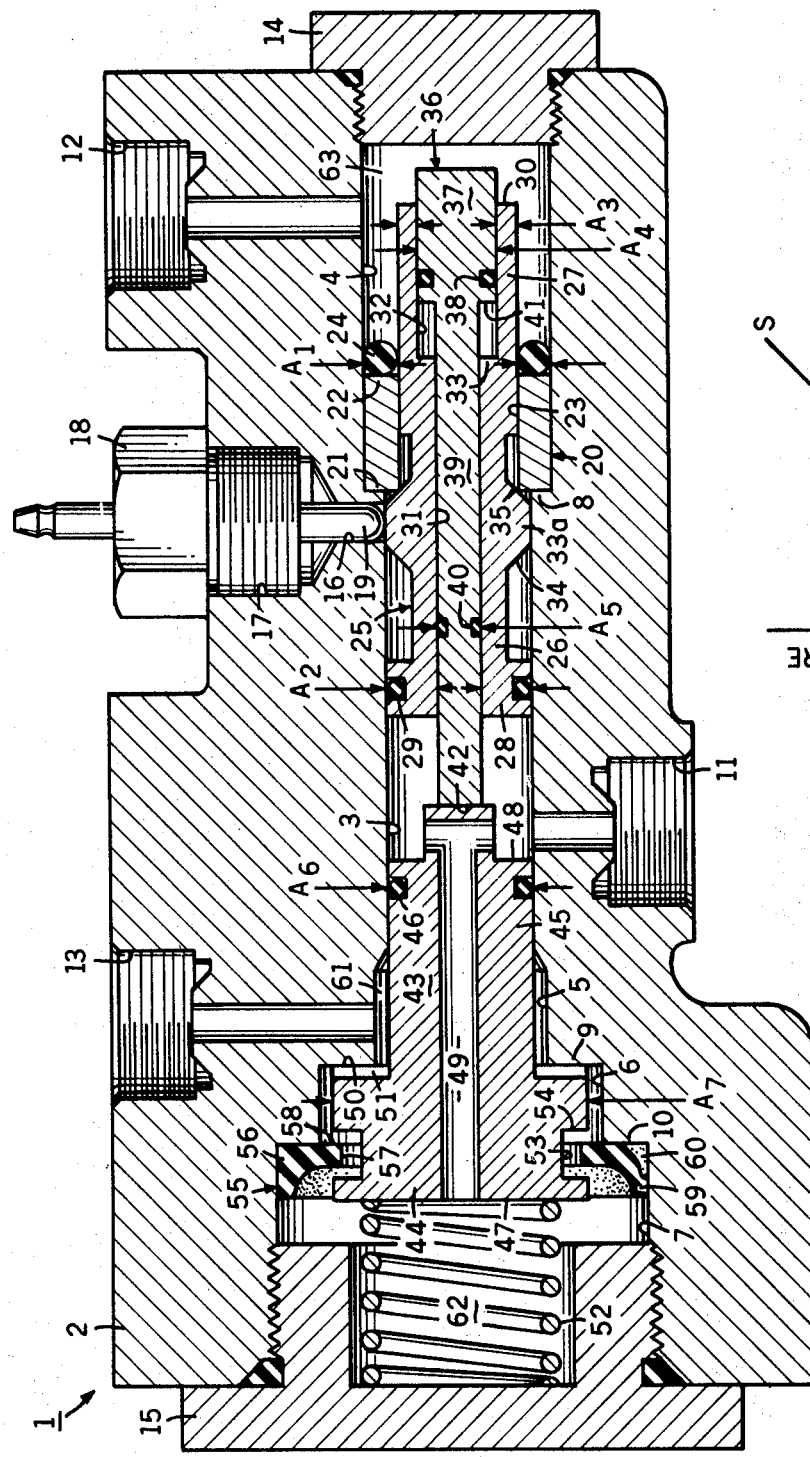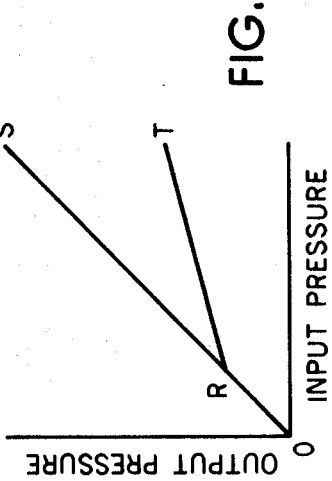

3,606,487
CONTROL VALVE
Raymond J. Kersting, Dellwood, Mo., assignor to
Wagner Electric Corporation, Newark, N.J.
Filed Nov. 4, 1969, Ser. No. 873,900
Int. Cl. B60t 8/26, 11/34, 17/22
U.S. Cl. 303—6C          15 Claims

ABSTRACT OF THE DISCLOSURE

A control valve for use in a dual or split brake system having a switch operating piston movable from a centered position toward opposed translated positions in response to a predetermined differential between separately supplied fluid pressures acting thereon. The switch operating piston also includes driving means subjected to the separately supplied fluid pressures and drivingly engaged with a metering piston, said driving means being responsive to the supplied fluid pressures in excess of a predetermined value to drive said metering piston toward a position effecting a metered application through said control valve of one of the supplied fluid pressures.

---

This invention relates to dual fluid pressure systems in general and in particular to control valves for controlling pressure fluid flow through one of said systems.

In the past, control valves, such as a combination type driver warning and proportioning valve, were utilized in a dual or split braking system having a switch operating piston therein for energizing a driver warning or dash lamp in the event of a fluid pressure failure in one of the split systems and also having a proportioning or metering piston therein for proportioning the fluid pressure supplied to the split system connected with the vehicle rear brakes. Such combination type valves were also provided with a by-pass feature or construction to by-pass the proportioning valve and obviate the proportioning function thereof in the event of a fluid pressure failure in the split system connected with the vehicle front brakes in order to utilize the maximum available fluid pressure for braking during such an emergency condition; however, one of the disadvantageous or undesirable features of such past combination valves was that special passage means was provided either in the housing or in the proportioning piston itself to accommodate such by-pass function.

The primary object of the present invention is to provide a control valve which overcomes the aforementioned disadvantageous or undesirable features, and this, as well as other objects and advantageous features of the present invention, will become apparent hereinafter.

Briefly, the present invention comprises a control valve having a housing, means movable in said housing from a normally centered position toward opposed translated positions in response to a predetermined differential between separate fluid pressures supplied to said housing, other means for effecting a metered application through said housing of one of the supplied fluid pressures, and driving means responsive to the supplied fluid pressures in excess of a predetermined value to drivingly actuate said other means.

In the drawings wherein like numerals refer to like parts wherever they occur:

FIG. 1 is a sectional view showing a control valve embodying the present invention, and FIG. 2 is a graphical representation illustrating the output or applied fluid pressure effected by the control valve of FIG. 1 in response to the input or supplied fluid pressure.

Referring now to the drawings in detail and in particular to FIG. 1, a control valve 1 is provided with a housing 2 having a bore 3 therein interposed between a counterbore 4 and stepped counterbores 5, 6 and 7, and shoulders 8, 9 and 10 are provided on said housing between the bore and counterbore 3, 4, the stepped counterbores 5, 6, and the stepped counterbores 6, 7, respectively. Inlet ports 11, 12, which are adapted for connection with separate fluid pressure generating chambers of a split system master cylinder (not shown), are provided in the housing 2 intersecting with the bore 3 and counterbore 4, respectively, and an outlet port 13, which is adapted for connection with one of the rear and front vehicle brakes (not shown), is also provided in said housing intersecting with the counterbore 5. Closure members or end plugs 14, 15 are threadedly received in the open ends of the counterbores 4, 7, respectively, and a cross-bore 16 is also provided in the housing 2 having one end intersecting with the bore 3 adjacent to the shoulder 8 and the other end thereof connecting with a cross-counterbore 17 which is threaded at its open end to receive an electrical switch 18 of a type well known to the art. The switch 18 is provided with a switch operating member 19 which is movable between an inoperative or circuit breaking position (as shown) and an operative or circuit making position displaced downwardly into the bore 3, as discussed hereinafter, for completing an electrical circuit to energize a driver warning or dash lamp (not shown), as well known in the art. A centering member or piston 20 is slidably received in the counterbore 4 having opposed ends or abutment surfaces 21, 22, and an axially extending bore 23 is provided through said centering piston between said opposed ends thereof. An O-ring seal 24 is sealably engaged between the counterbore 4 and the rightward end 22 of the centering piston 20, and the leftward opposed end 21 thereof is normally engaged with the housing shoulder 8, said O-ring and rightward end of said centering piston defining an annular effective area $A_1$ subjected to the fluid pressure at the outlet port 12 at all times.

A reciprocal switch actuating member or piston, indicated generally at 25, is shown in its centered or normal position in the housing 2 having spaced opposed extensions 26, 27 thereon. The switch piston extension 26 is provided with an end portion 28 slidably received in the housing bore 3, and a peripheral seal 29 is carried on said end portion in sealing engagement with said housing bore. The switch piston extension 27 is slidably received in the centering piston bore 23 and extends through the O-ring seal 14 in sealing engagement therewith, and said extension 27 protrudes coaxially into the housing counterbore 4 having an end portion 30 thereon opposed to the end portion 28. A pair of stepped bores 31, 32 are axially provided in the switch piston 25 intersecting with the opposed portions 28, 30 thereof, respectively, and a shoulder 33 is provided on said switch piston between said stepped bores. An annular effective area $A_2$ is defined on the leftward end portion 28 of the switch piston 25 substantially between the stepped bore 31 and the sealing engagement of the seal 29 with the housing bore 3 and subjected to the fluid pressure at the inlet port 11 at all times, and the area $A_2$ is greater than and opposed to another annular effective area $A_3$ which is defined on the rightward end portion 30 of said switch piston substantially between the periphery of the extension 27 and the larger stepped bore 32 and subjected to the fluid pressure at the inlet port 12 at all times. It should be noted that the area $A_3$ is additive to the area $A_1$, and the sum of areas $A_1$, $A_3$ is greater than area $A_2$. The switch piston 25 is also provided with a switch positioning portion or peripheral land 33a which is positioned beneath the housing cross-bore 16 in positioning engagement with the switch operating member 19 urging it toward its inoperative position when said switch pison is in its centered position, as shown, and peripheral cam faces 34, 35 are also provided on said switch piston on opposite sides of said land, said cam face 35 also providing an abutment for engagement with the leftward end 21 of the centering piston 20.

A control member or driving piston, indicated generally at 36, is provided with an enlarged head portion 37 slidably received in the switch piston larger stepped bore 32, and a peripheral seal 38 is carried in said head portion in sealing engagement with said larger stepped bore. A reduced extension or stem 39 is integrally formed with the driving piston head 37 being slidably received in the switch piston smaller stepped bore 31, and a peripheral seal 40 is carried in said stem in sealing engagement with said smaller stepped bore. An annular shoulder or abutment 41 is provided in the driving piston head 37 for engagement with the smaller piston shoulder 33 and normally spaced therefrom, and the stem 39 protrudes coaxially into the housing bore 3 having a free or driving end or abutment 42 thereon drivingly engaged with a metering or proportioning member or piston, indicated generally at 43, which is slidable in the leftward end of the housing bore 3, as discussed hereinafter. An effective area $A_4$ is defined in the driving piston head 37 substantially by the sealing engagement of the seal 38 with the larger stepped bore 32 and subjected to the fluid pressure at the inlet port 12, and said area $A_4$ is greater than and opposed to another effective area $A_5$ defined on said driving piston substantially by the sealing engagement of the seal 40 with the smaller stepped bore 31, said area $A_5$ being subjected to the fluid pressure at the inlet port 11.

The proportioning piston 43 is provided with a head portion 44 movable in the housing counterbores 6, 7 and an integrally formed, reduced extension 45 slidable in the housing bore 3, and a peripheral seal 46 is carried in said extension in sealing engagement with said housing bore. Opposed ends 47, 48 are provided in the proportioning piston head and extension 44, 45, and a passage 49 in the proportioning piston 43 intersects said opposed ends. An annular shoulder or abutment 50 having a plurality of radially extending passages or grooves 51 therein is provided in the proportioning piston head 44, and a metering or proportioning spring 52 is pre-compressed between the closure member 15 and said proportioning piston leftward end portion 47 normally urging said proportioning piston shoulder 50 into abutment with the housing shoulder 9. The rightward end portion 48 of the proportioning piston 43 is normally urged into abutting engagement with the driving end 42 of the driving piston 36 by the spring 52. An annular peripheral groove 53 is provided in the proportioning piston head 44 having a side wall 54 which defines a valve member for engagement with an annular sealing or seating member, indicated generally at 55. The sealing member 55 is provided with an annular base portion 56 having an aperture 57 therethrough, and said base portion is normally in abutting engagement with the housing shoulder 9. An annular valve seat 58 is defined on said base portion 56 about the aperture 57 for seating engagement with the valve member 54. The seal 55 is also provided with an annular peripheral lip 59 integral with the base portion 56 and normally in sealing engagement with the housing counterbore 7, and a plurality of radially extending return flow passages 60 are provided between said base portion and said lip, said return flow passages normally being closed by the sealing engagement of said lip with said housing conterbore. An effective area $A_6$ is defined on the proportioning piston 43 substantially by the sealing engagement of the seal 46 with the housing bore 3, and said area $A_6$ is less than and opposed to another effective area $A_7$ defined on said proportioning piston substantially by the sealing engagement of said valve member 54 with the seating member valve seat 58.

An outlet chamber 61 is defined in the housing counterbores 5, 6 rightwardly of the seating member 55 in open pressure fluid communication with the outlet port 13. The portion of the housing bore 3 between the switch and proportioning pistons 25, 43 is connected through the proportioning piston passage 49 with the portion of the housing bore 7 between the closure member 15 and the seating member 55 to define an inlet chamber 62 in open pressure fluid communication with the inlet port 11 at all times, and to complete the description of the control valve 1, another inlet chamber 63 is defined in the housing counterbore 4 between the closure member 14 and the seal 24, the switch piston end 30, and the driving piston head 37, said inlet chamber 63 being connected in open pressure fluid communication with the inlet port 12 at all times.

In the operation with the component parts of the control valve 1 positioned as shown in the drawings and as described hereinafter, separately supplied or input fluid pressures $P_1$, $P_2$ normally having substantially equal magnitudes are supplied upon actuation of a tandem or split system master cylinder (not shown) to the inlet ports 11, 12. The input fluid pressure $P_2$ flows from the inlet port 12 into the inlet chamber 63 acting on the area $A_1$ of the centering piston 20 to establish a force $P_2A_1$ and also acting on the area $A_3$ of the switch piston 25 to establish a force $P_2A_3$, and the input fluid pressure $P_1$ flows from the inlet port 11 through the inlet chamber 62 and therefrom through the proportioning piston groove 53 and the outlet chamber 61 to establish an output or applied fluid pressure $P_0$ at the outlet port 13 having a magnitude substantially equal to that of the input fluid pressure $P_1$. The input and output fluid pressures $P_1$, $P_0$ respectively act on the difference between the effective areas $A_6$, $A_7$ to effect opposing forces $P_1(A_7-A_6)$ and $P_0(A_7-A_6)$ which are equal and opposite so long as the magnitudes of said input and output fluid pressures are substantially equal.

Since the area $A_2$ is greater than the area $A_3$ and the fluid pressures $P_1$, $P_2$ are substantially equal, the force $P_1A_2$ urges the switch piston 25 rightwardly against the force $P_2A_3$ to drivingly engage the switch piston abutment 35 with the centering piston end 21, but since the additive areas $A_1$, $A_3$ are greater than the area $A_2$, the forces $P_2A_1$, $P_2A_3$ are also additive and opposed to the force $P_1A_2$ thereby normally preventing the rightward movement of said switch piston from its normal or centered position. The force $P_2A_1$ urges the centering piston 20 leftwardly to engage the end 21 thereof with the housing shoulder 8; therefore, since the area $A_3$ is less than the area $A_2$, the force $P_2A_3$ is ineffective to move the switch piston 25 leftwardly from its centered position against the opposing force $P_1A_2$, when said centering piston is urged into engagement with said housing force by the force $P_2A_1$. In this manner, the switch piston 25 is normally maintained in its centered position so long as the magnitudes of the supplied fluid pressures $P_1$, $P_2$ are within a predetermined differential.

The input fluid pressures $P_1$, $P_2$ respectively act on the opposed effective areas $A_5$, $A_4$ of the driving piston 36 to establish opposed forces $P_2A_4$, $P_1A_5$ acting across said driving piston. Since the magnitudes of the input fluid pressures $P_1$, $P_2$ are substantially equal and the area $A_4$ is predeterminately greater than the area $A_5$, the force $P_1A_5$ is, of course, greater than the force $P_2A_4$ to normally urge the driving piston 36 in a leftward direction in opposition to the compressive force $Fc$ of the metering spring 52. When the magnitudes of the input fluid pressures $P_1$, $P_2$ are increased to a predetermined value R, as shown on the line OR in the graph of FIG. 2, the forces $P_2A_4$, $P_1A_5$ are correspondingly increased, and the force $P_2A_4$ overcomes the opposing force $P_1A_5$ and the additive spring force $Fc$ to move the driving piston 36 leftwardly and concertedly drive the proportioning piston 43 against the compressive force $Fc$ of the metering spring 52 toward a position engaging the proportioning piston valve member 54 with the valve seat 58 of the seating member 55 thereby interrupting pressure fluid communication between the inlet and outlet ports 11, 13 to isolate the output fluid pressure $P_0$ from the inlet fluid pressure $P_1$.

From the graph of FIG. 2, it is obvious that the increases in the magnitudes of the input fluid pressures $P_1$, $P_2$ in excess of the predetermined value R, as illustrated by the line RS of said graph, would result in proportionally reduced increases in the output fluid pressure $P_0$, as illustrated by the line RT of said graph. For instance, when the input fluid pressures $P_1$, $P_2$ are increased to a value in excess of the predetermined value R, the input forces $P_1(A_7-A_6)+P_1A_5$ are correspondingly increased and assisted by the spring force Fc to concertedly move the driving and proportioning pistons 36, 43 rightwardly from the isolating position of said proportioning piston against the opposing output forces $P_0(A_7-A_6)+P_2A_4$ toward a metering position of said proportioning piston. This rightward movement of the proportioning piston 43 toward its metering position disengages the valve member 54 from its valve seat 58 to effect a metered application of the increased input fluid pressure $P_1$ through the proportioning piston groove 53 and seating member aperture 57 into the outlet chamber 62 to establish a proportional or ratioed increase in the output fluid pressure $P_0$ at the outlet port 13, as shown by the line RT in the graph of FIG. 2 wherein $$P_0 = \frac{P_1(A_7-A_6)+P_1A_5+Fc-P_2A_4}{A_7-A_6}$$

Of course, the increased input and output fluid pressures $P_2$, $P_0$ in excess of the predetermined value R effect a corresponding increase in the output force $$P_2A_4+P_0(A_7-A_6)$$

and when the increased output force $P_2A_4+P_0(A_7-A_6)$ attains an increased value substantially equal to the increased input force $P_1(A_7-A_6)+P_1A_5$ and the spring force Fc, the driving and proportioning pistons 36, 43 are again concertedly moved leftwardly toward the isolating position of said proportioning piston to reposition the valve member 51 in lapped engagement with the valve seat 58 and again isolate the increased input and output fluid pressures $P_1$, $P_0$. It is, of course, obvious that the driving and proportioning pistons 36, 43 will be concertedly responsive to further increases in the input fluid pressures $P_1$, $P_2$ to effect further proportional increases in the output fluid pressure $P_0$ in the same manner as previously described, and it should be noted that the substantially equal increases of the input fluid pressures $P_1$, $P_2$ which obviates displacement or translatory movement of the switch piston 25 from its centered position.

When the split system master cylinder is deactuated, the input fluid pressures $P_1$, $P_2$ are vented to the atmosphere which eliminates the forces $P_1A_2$, $P_2A_3$ acting on the switch piston 25, the force $P_2A_1$ acting on the centering piston 20, and the forces $P_2A_4$, $P_1A_5$ acting on the driving piston 36. The venting of the input fluid pressure $P_1$ also eliminates the input force $P_1(A_7-A_6)$ acting on the proportioning piston 43, and since the force $P_2A_4$ is also eliminated, the output force is reduced to $P_0(A_7-A_6)$. Upon the elimination of the input fluid pressure $P_1$, the output fluid pressure $P_0$ acting on the seating member 55 displaces the lip 59 thereof from sealing engagement with the housing counterbore 7, and in this manner, the applied or output fluid pressure $P_0$ returns from the outlet port 13 through the outlet chamber 62 and past the displaced lip 59 of the seating member 55 through the return flow passages 60 thereof into the inlet chamber 62 to the inlet port 11. When the output fluid pressure $P_0$ is so reduced to correspondingly reduce the output force $P_0(A_7-A_6)$ to a value less than the metering spring force Fc, the metering spring 52 moves the proportioning piston 43 rightwardly toward its original position re-engaging the shoulder 50 thereof with the housing shoulder 9 and displacing the valve member 54 from its seat 58 on the sealing member 55 to again open the proportioning piston passage 53 re-establishing open pressure fluid communication therethrough between the inlet and outlet ports 11, 13 to effect complete elimination of the output fluid pressure $P_0$.

In the event of the failure of the input fluid pressure $P_2$ due to a malfunction of the split system master cylinder or other leaks or the like, it is, of course, desirable to obviate the metering or proportioning function or actuation of the metering piston 43 to effect the application of an unaltered or unmetered fluid pressure to the outlet port 13 in order to utilize the maximum available fluid pressure for energizing the vehicle brake set connected with said outlet port under such emergency conditions; therefore, when the magnitude of the input fluid pressure $P_1$ exceeds that of the failed input fluid pressure $P_2$ by a predetermined value, the forces $P_1A_5$ and $P_1A_2$ acting on the driving and switch pistons 36, 25 will displace said driving and switch pistons rightwardly relative to the proportioning piston 43 toward a displaced or translated position in the housing 2 engaging the switch piston rightward end 30 and the driving piston head 37 with the closure member 14. This rightward translatory movement of the switch and driving pistons 25, 36 disengages the driving end 42 of said driving piston from the proportioning piston 43 and drivingly engages the switch piston cam surface 35 with the rightward end 21 of the centering piston 20 to also effect concerted rightward movement of said centering piston and the seal 24. The switch piston land 33a is disengaged from the switch operating member 19 upon the rightward translatory movement of the switch piston 25 permitting the downward displacement movement of said switch operating member from its normal or circuit breaking position into the bore 3 toward its operative or circuit making position thereby completing the electrical circuit for energizing the driver warning dash lamp (not shown). With the driving end 42 of the driving piston 36 disengaged from the proportioning piston 43, the input fluid pressure $P_1$ flows from the inlet port 11 through the inlet chamber 62 and proportioning piston passage 49 through the proportioning piston groove 53 and the outlet chamber 61 to establish an unaltered or unmetered output fluid pressure $P_0$ at the outlet port 13. It is, of course, obvious that the compressive force of the metering spring 52 will maintain the proportioning piston 43 in its inoperative position with the proportioning piston shoulder 50 engaged with the housing shoulder 9 since the input and output fluid pressures $P_1$, $P_0$ act on the same area, i.e., $A_7-A_6$, to establish substantially equal and self-cancelling forces when said proportioning piston is in its inoperative position.

The control valve 1 functions in substantially the same manner to complete the electrical circuit and energizing the driver warning dash lamp in the event of the alternative failure of the input fluid pressure $P_1$ wherein the force of the input fluid pressure $P_2$ acting on the area $A_3$ of the switch piston 25 effects the leftward translatory movement thereof, and it is, of course, apparent that the leftward end 21 of the centering piston 20 is urged into engagement with the housing shoulder 8 in response to the input fluid pressure $P_2$ acting on the centering piston area $A_1$. During the leftward translatory movement of the switch piston 25, the switch piston land 33a is disengaged from the switch operating member 19 permitting the downward displacement movement thereof from its circuit breaking position into the bore 3 toward its operative or circuit making position for completing the electrical circuit to energize the driver warning dash lamp. If the magnitude of the input fluid pressure $P_2$ acting on the area $A_4$ of the driving piston 36 is great enough, it is, of course, obvious that the force $P_2A_4$ will urge the driving piston 36 leftwardly to concertedly drive the proportioning piston 43 against the compressive force Fc of the metering spring 52; however, since the input fluid pressure $P_1$ has failed, this movement of the proportioning piston 43 has no metering or altering effect.

From the foregoing, it is now apparent that a novel control valve 1 meeting the objects set out hereinbefore, as well as other objects and advantageous features, is provided and that changes or modifications as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing, means for comparing the magnitudes of separate fluid pressures supplied thereto and movable in said housing from a normally centered position toward opposed translated positions in response to oppositely acting differentials in excess of a predetermined amount between the magnitudes of the supplied fluid pressures acting thereon, metering means movable in said housing for controlling the application therethrough of one of the supplied fluid pressures, and other means subjected to the supplied fluid pressures and movable in said first named means for driving engagement with said metering means, said other means being movable in response to the supplied fluid pressures of a predetermined value acting thereon to concertedly drive said metering means toward a position in said housing isolating the one supplied fluid pressure from the applied fluid pressure and said metering means being thereafter further movable in response to increases in the one supplied fluid pressure acting thereon in excess of the predetermined value in concert with said other means responsive to increases in the one and other supplied fluid pressures in excess of the predetermined value respectively acting thereon toward a metering position in said housing effecting a metered increase in the applied fluid pressure in a predetermined ratio with the increased one supplied fluid pressure in excess of the predetermined value.

2. A control valve according to claim 1, wherein said other means includes a pair of opposed differential areas respectively subjected to the one and other supplied fluid pressures, said other means being movable to concertedly drive said metering means toward its isolating position in response to the one and other fluid pressures of the predetermined value acting on one of said differential areas and the other of said differential areas, respectively.

3. A control valve according to claim 2, wherein said other differential area is predeterminately greater than said one differential area.

4. A control valve according to claim 2, wherein said other means includes piston means movable in said first named means, opposed portions on said piston means respectively subjected to the one and other supplied fluid pressures, said opposed differential areas being respectively defined on said opposed portions, and one of said opposed portions including a driving end drivingly engaged with said metering means.

5. A control valve according to claim 4, wherein said first named means includes other piston means movable in said housing and having opposed end portions, a pair of other opposed areas defined on said opposed end portions and subjected to the one and other supplied fluid pressures, respectively, said first named piston means being movable in said other piston means, said other piston means being movable toward one of its opposed translated positions to concertedly move said first named piston means toward a position disengaging the driving end thereof from said metering means and obviating the metering actuation thereof when the magnitude of one of the one and other supplied fluid pressures acting on one of said other opposed areas exceeds that of the other of the one and other supplied fluid pressures acting on the other of said other opposed areas by the predetermined amount.

6. A control valve according to claim 5, comprising a pair of stepped bores in said other piston means respectively intersecting with said opposed end portions, said first named piston means including a head portion slidable in one of said stepped bores, a stem portion connected with said head portion and slidable in the other of said stepped bores, one of said differential areas being defined on said head portion and the other of said differential areas being defined on said stem portion, and said driving end being defined on said stem portion.

7. A control valve according to claim 2, comprising a pair of second opposed differential areas on said metering means for respective subjection to the one supplied fluid pressure and the applied fluid pressure, said metering means being movable from its isolating position toward its metering position to effect the metered increase in the applied fluid pressure in response to the one supplied fluid pressure acting on the difference between said second differential areas and assisted by the one supplied fluid pressure acting on said one first named differential area against the applied fluid pressure acting on the difference between said second differential areas and assisted by the other supplied fluid pressure acting on said other of said first named differential areas.

8. A control valve according to claim 7, comprising resilient means engaged with said metering means, said resilient means opposing movement of said metering means toward its isolating position and assisting movement thereof toward its metering position.

9. A control valve according to claim 1, comprising a pair of opposed areas on said first named means respectively subjected to the one and other supplied fluid pressures, said first named means being movable toward one of its opposed translated positions to concertedly urge said other means toward a position disengaged from said metering means and obviate the metering actuation thereof when the magnitude of one of the one and other supplied fluid pressures acting on one of said opposed areas exceeds that of the other of the one and other supplied fluid pressures acting on the other of said areas by the predetermined amount.

10. A control valve according to claim 1, comprising centering means movable in said housing for respective engagement with said housing and said first named means and subjected to one of the one and other supplied fluid pressures, said centering means being urged in response to the one of the one and other supplied fluid pressures acting thereon toward engagement with said housing and said first named means to oppose movement of said first named means toward one of its opposed translated positions.

11. A control valve comprising a housing having a pair of inlet ports and an outlet port therein, metering means movable in said housing for controlling pressure fluid communication between one of said inlet ports and said outlet ports, other means for comparing the magnitudes of the fluid pressures at said inlet ports and movable in said housing from a normally centered position toward opposed translated positions in response to oppositely acting differentials in excess of a predetermined amount between the magnitudes of the fluid pressures at said inlet ports acting thereon, driving means movable in said other means for driving engagement with said metering means and subjected to the fluid pressures at said inlet ports, and resilient means urging said metering means toward engagement with said driving means, said driving means being movable in response to the fluid pressures at said inlet ports of a predetermined value to concertedly drive said metering means against the force of said resilient means toward a position in said housing interrupting pressure fluid communication between said one inlet port and said outlet port and said metering means being thereafter further movable in response to increases in the fluid pressure at said one inlet port in excess of the predetermined value in concert with said driving means responsive to the increases in the fluid pressures at said inlet ports in excess of the predetermined value and assisted by the force of said resilient means toward a metering position in said housing establishing metered pressure fluid communication between the fluid pressures at said one inlet port and said outlet port to effect a metered increase in the fluid pressure at said outlet port in a predetermined ratio with the increased fluid pressure at said one inlet port in excess of the predetermined value.

12. A control valve according to claim 11, wherein said metering means defines with said housing a pressure fluid flow passage therethrough for the one supplied fluid pressure, means in said housing defining a valve seat about said flow passage, said metering means including a piston movable in said flow passage and connected with said resilient means, and valve means on said piston means for engagement with said valve seat, said piston means being concertedly driven against the force of said resilient means by said other means in response to the supplied fluid pressure of the predetermined value acting thereon toward the isolating position engaging the valve means with said valve seat to close said flow passage interrupting pressure fluid communication therethrough between the one supplied fluid pressure and the applied fluid pressure, a pair of opposed effective differential areas on said metering means for subjection to the one supplied fluid pressure and the applied fluid pressure, said piston means being thereafter further movable in response to increases in the one supplied fluid pressure in excess of the predetermined value acting on the difference between said differential areas and assisted by the force of said resilient means against the applied fluid pressure acting on the difference between said differential areas and assisted by the increased one and other supplied fluid pressures in excess of the predetermined value acting on said other means toward the metering position disengaging said valve means from said valve seat to open said flow passage establishing metered pressure fluid communication therethrough between the one supplied fluid pressure and the applied fluid pressure and effect the metered increase in the applied fluid pressure.

13. A control valve comprising a housing having a pair of inlet ports and an outlet port therein, means in said housing defining a valve seat between one of said inlet ports and said outlet port, a metering piston movable in said housing between said one inlet port and said outlet port including valve means for engagement with said valve seat, and opposed areas on said metering piston for respective subjection to the fluid pressures at said one inlet port and said outlet port, a metering spring normally urging said metering piston toward a position in said housing to disengage said valve means from said valve seat and establish open pressure fluid communication between said one inlet port and said outlet port, a switch actuating piston for comparing the magnitudes of the fluid pressures at said inlet ports and movable in said housing between said inlet ports from a normally centered position toward opposed translated positions in response to oppositely acting differentials in excess of a predetermined amount between the magnitudes of the fluid pressures at said inlet ports acting thereon, a driving piston movable in said switch piston between said inlet ports, a pair of opposed differential areas on said driving piston respectively subjected to the fluid pressures at said inlet ports, and abutment means on said driving piston drivingly engaged with said metering piston, said driving means being movable in response to the fluid pressures at said inlet ports of a predetermined value respectively acting on said opposed differential areas to concertedly move said metering piston against the force of said resilient means and engage said valve means with said valve seat to interrupt pressure fluid communication between said one inlet port and said outlet port, and said metering piston being thereafter further movable in response to increases in the fluid pressure at said one inlet port acting on one of said first named opposed areas and assisted by the force of said resilient means against the fluid pressure at said outlet port acting on the other of said first named opposed areas and assisted by the increased fluid pressure at said one and other inlet ports in excess of the predetermined value respectively acting on said differential areas of said driving piston toward a metering position in said housing to disengage said valve means from said valve seat establishing metered pressure fluid communication between said one inlet port and said outlet port and effecting a metered increase in the fluid pressure at said outlet port in a predetermined ratio with the increased fluid pressure at said one inlet port in excess of the predetermined value.

14. A control valve according to claim 13, comprising a third pair of opposed areas on said switch piston respectively subjected to the fluid pressures at said inlet ports, said switch piston being movable toward one of its opposed translated positions to concertedly move said driving piston toward a position disengaging said abutment means from said metering piston to obviate metering actuation thereof when the magnitude of the fluid pressure at one of said one and other inlet ports acting on one of said third opposed areas exceeds that of the fluid pressure at the other of said one and other inlet ports acting on the other of said third opposed areas by the predetermined amount.

15. A control valve according to claim 13, comprising a pair of opposed end portions on said switch piston, a pair of stepped bores in said switch piston intersecting with said opposed end portions, respectively, said driving piston including a head portion slidable in the larger of said stepped bores, a stem portion connected with said head portion and slidable in the smaller of said stepped bores, the larger of said differential areas being defined on said head portion and subjected to the fluid pressure at said other inlet port, the smaller of said differential areas being defined on said stem portion and subjected to the fluid pressure at said one inlet port, and a free end on said stem portion defining said abutment means.

References Cited
UNITED STATES PATENTS

| | | | |
|---|---|---|---|
| 3,441,318 | 4/1969 | Bueler | 303—6 |
| 3,464,741 | 9/1969 | Falk | 303—6 |
| 3,498,681 | 3/1970 | Bueler | 303—6 |
| 3,508,793 | 4/1970 | Bueler | 303—6 |

MILTON BUCHLER, Primary Examiner

J. J. McLAUGHLIN, Assistant Examiner

U.S. Cl. X.R.

60—54.5; 137—87; 188—151, 152; 200—82; 303—84A